Nov. 10, 1925.
A. L. GENTER
1,560,796
THICKENING PROCESS
Filed Jan. 2, 1924
3 Sheets-Sheet 1
Fig. 1,
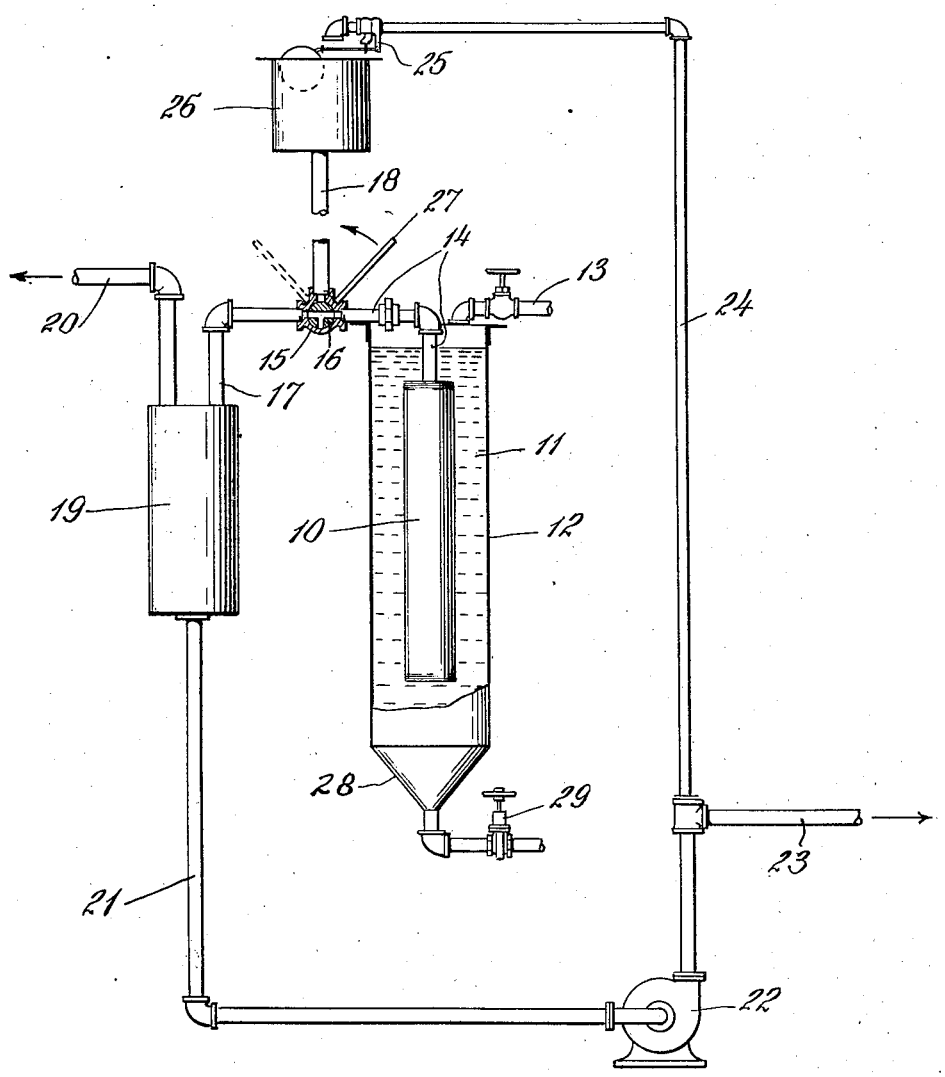
INVENTOR
Albert L. Genter
BY Pennie, Davis, Marvin and Edmonds
his ATTORNEYS

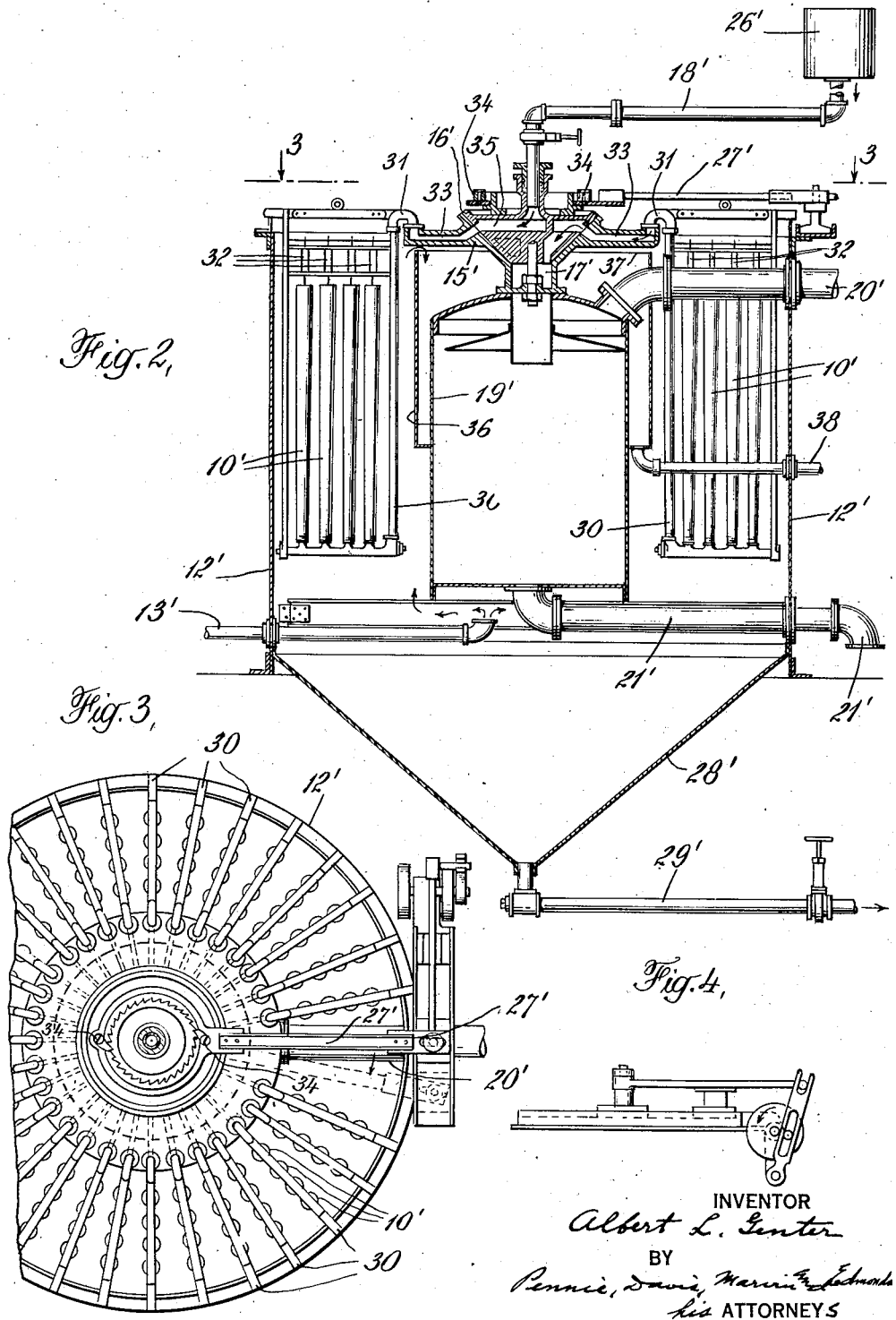

Nov. 10, 1925.
A. L. GENTER
THICKENING PROCESS
Filed Jan. 2, 1924
1,560,796
3 Sheets-Sheet 3
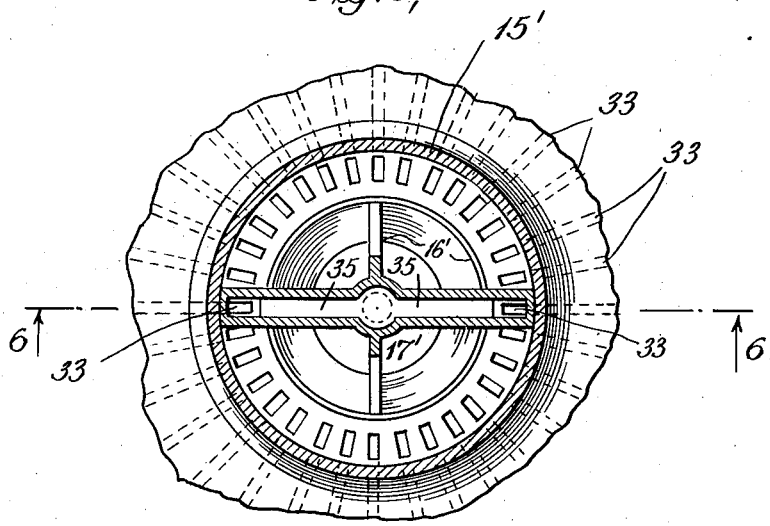
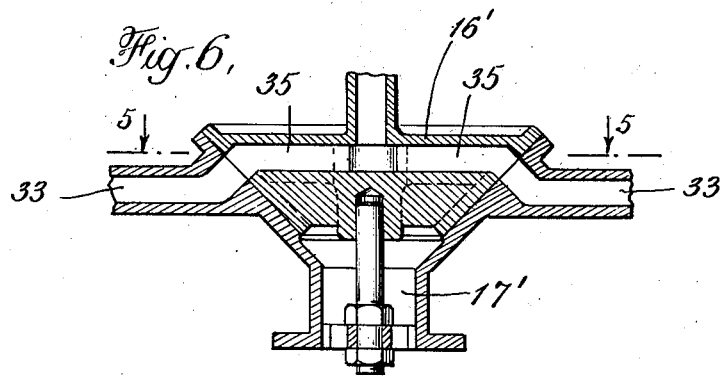
INVENTOR
Albert L. Genter
BY
his ATTORNEYS

Patented Nov. 10, 1925.

1,560,796

UNITED STATES PATENT OFFICE.

ALBERT LEGRAND GENTER, OF SALT LAKE CITY, UTAH, ASSIGNOR OF ONE-HALF TO GENERAL ENGINEERING COMPANY, OF SALT LAKE CITY, UTAH, A CORPORATION OF UTAH.

THICKENING PROCESS.

Application filed January 2, 1924. Serial No. 683,890.

*To all whom it may concern:*

Be it known that I, ALBERT L. GENTER, a citizen of the United States, residing at Salt Lake City, in the county of Salt Lake, State of Utah, have invented certain new and useful Improvements in Thickening Processes; and I do hereby declare the following to be a full, clear, and exact description of the invention, such as will enable others skilled in the art to which it appertains to make and use the same.

This invention relates to thickening processes and has for its object the provision of an improved thickening process. More particularly, the invention relates to a process for the rapid separation, by means of suction filtration, of solids, for example in the form of mud or sludge, from liquid mixtures which give off relatively large quantities of vapor or gas under reduction in pressure, such, for example, as relatively hot or boiling liquid mixtures and liquid mixtures carrying dissolved or absorbed gases.

Thickening processes of this character are at present carried on by continuously filtering the liquid mixture by means of a plurality of filter elements placed within a suitable thickening vessel or tank, and cleansing the filter elements in situ by means of a filtrate countercurrent in such manner that the greater portion of the filter elements is filtering under the action of suction while a certain remaining portion of the elements is being automatically, and continuously or successively, cleansed of adhering intercepted solids by means of pure filtrate countercurrent. This filtrate countercurrent is forced back through the filter elements by means of additional pressure applied through the agency of compressed air at a rotating timing valve located above a body of filtrate stored in suitable reservoirs, or is permitted to gravitate back through the filter elements by its own weight from a point between the timing valve and the elements, the instant filtration suction is cut off or released by the timing valve.

It is well known that in the filtration of hot or boiling liquids by suction means, the pressure within the filter elements themselves is so reduced by the use of positive vacuum, that the hot filtrate, passing to the interior of the elements through the filtering medium, flashes to steam or vapor very rapidly and throws an extra burden on the vacuum pump, and in addition reduces, the space that should be occupied by condensed filtrate. In consequence of these vapor conditions the filtration rate is greatly reduced.

It is furthermore a scientific fact that for every ounce or pound of pressure reduction less than that of the atmosphere, the boiling point of water and other liquids is proportionately reduced, and, if the temperature is kept constant during this procedure, the vapor tension, i. e. vapor pressure of the liquid itself, increases. For instance, water boils at 212 degrees Fahrenheit or 100 degrees centigrade under standard atmospheric pressure at sea level. For pressures less than atmospheric the boiling point decreases. These pressures less than atmospheric are technically expressed as absolute pressures in pounds per square inch, or in head of a mercury column which expresses the amount of vacuum by means of the difference between the absolute head of mercury and the standard atmospheric head of 29.921 inches, called 30 inches in engineering measurements. At a vacuum of 29 inches, pure water will boil at approximately 79 degrees Fahrenheit. A cubic inch of water in boiling at standard atmospheric pressure, or in vacuo and at a temperature equivalent to its boiling point, will flash to vapor or evaporate and occupy a volume of 1642 cubic inches.

In the filtration of cold water or condensed liquids by means of removing the atmospheric pressure from the interior of the filter elements through any vacuum producing agency, theoretically one cubic inch of pure, air-or-gas-free water will be drawn through the filtering medium for every cubic inch of space made free on the filtrate side of said elements through the aforesaid vacuum producing agency. If the water were filtered, by the same means, at boiling point there would have to be substantially 1642 cubic inches of vapor withdrawn by the suction means from the interior of the elements before one cubic inch of filtrate would flow through the medium. Or, if the liquid to be filtered contained dissolved or absorbed gases, such, for example, as an ore pulp which has been submitted to flotation or cyanide treatment, the volume of vapor and gas which would have to be withdrawn by this suction means from the interior of the elements before one cubic inch of filtrate would flow through the medium, would be similarly increased in proportion to the amount of gas dissolved or absorbed in the liquid.

For these reasons, vacuum filtration of relatively hot solutions or liquids, or liquids containing considerable amounts of dissolved gases, is ordinarily very inefficient.

In some instances the temperature of the liquid containing the suspended solids, can be dropped well below the boiling point without trouble. In other instances, however, such as the filtration and thickening of hot sugar juices that have been limed and saturated with carbon dioxide gas, cooling the mixture produces heat losses, slowing up of the separation of precipitated impurities from the clear sugar juice, and consequent re-dissolving of precipitated impurities by the sugar juice, as well as resulting sugar losses.

Heretofore it has been customary in such instances as the foregoing to install and use considerably more filter area and vacuum pump capacity than is needed when a positive filtration pressure from a pump source is utilized. It has also heretofore been the practice, in treating such hot mixtures, in continuous rotary vacuum filters and vacuum filter-thickeners, to use approximately the same filtration period, and even a longer filtration period preparatory to the cake discharge period or pause, than is practiced in handling colder liquid mixtures. This has been due to the belief that the slower filtration rate justifies a longer filtration period in order to build up a cake of intercepted solids that can be sucessfully discharged from the elements. This period of filtration has varied from four to six minutes and even longer, and has been alternated with a much shorter countercurrent period, i. e. two to four seconds. The countercurrent period has been in the nature of a shock but heretofore it has been produced by opening and closing a valve that admitted compressed air or steam to the timing valve and thence through their connections to the filtrate chambers which contained sufficient filtrate to flood, under the pressure of the air or steam, the intercepted solids from the filter element surfaces. The admission of an expansible fluid, such as air or steam, to the filter elements and their connections is extremely disadvantageous as it necessitates the installation of materially increased vacuum pump capacity.

As a consequence of the prior practice just outlined, the capacity on hot first carbonation beet sugar juices, for instance, has been but one-fourth to one-third of the capacity produced by the use of the present invention.

My present invention greatly increases the capacity of vacuum filter-thickeners, when used for the filtration of hot solutions when there is a tendency of the hot filtrate to flash to vapor within the filter elements while filtering, or when used for the filtration of liquids containing absorbed or dissolved gases that are liberated under reduced pressure, or for filtering any liquids which give off relatively large quantities of vapor or gas under reduction in pressure.

The invention will be better understood by reference to the accompanying drawings illustrating, by way of example, apparatus for carrying out the invention.

In these drawings—

Fig. 1 is a more or less diagrammatic view of a simplified form of apparatus illustrating the principles of operation of the improved process.

Fig. 2 is a view in transverse section of one embodiment of an apparatus for carrying out the present invention on a commercial scale;

Fig. 3 is a view taken along the line 3—3 of Fig. 2, and showing substantially a plan of this apparatus;

Fig. 4 is a detail view of a quick return mechanism for actuating the ratchet device shown in Fig. 3 for operating the timing valve;

Fig. 5 is a view in horizontal section, taken on the line 5—5 of Fig. 6, of the valve for cutting off the filter suction and placing one or more of the filter elements in connection with a liquid countercurrent supply. This figure shows a view of the valve with the top or cover of its plug or rotating element removed and leaving the remainder of the plug in place; and Fig. 6 is a view of this valve in vertical section taken on the line 6—6 of Fig. 5.

The invention contemplates the reduction or the elimination of the formation of vapor or the liberation of gas within the filtrate, and, moreover, the reduction of even the tendency for hot filtrate to flash to vapor. Furthermore, the invention provides for the application of the countercurrent in such manner that no air, gas, steam or the like, is admitted to the filter elements or their connections. Thus, in carrying out the present invention the mixture to be filtered and the filtrate are maintained continuously in contact with the opposite sides of a filter medium, preferably by submerging one or more filter elements in the mixture to be filtered within a suitable thickening vessel or tank. A reduced pressure, preferably a partial vacuum, is then applied to the filtrate side of the filter medium for a limited time only, that is, until the formation of vapor or liberation of gas within the filtrate begins to appreciably reduce the space occupied by the liquid portion of the filtrate.

This period of filtration is, therefore, of relatively short duration as compared with the filtration periods contemplated by the processes of the prior art. The filtration periods in the prior processes are ordinarily from four to six minutes and even longer, whereas, the filtration period of the present process may vary from a few seconds to only not much over two minutes, depending upon the characteristics of the liquid undergoing filtration, and the conditions, such as for example as the temperature, under which filtration is carried on. The average filtration period is probably in the neighborhood of thirty seconds.

The filtration period is followed, in accordance with the method of the present invention, by a countercurrent, the countercurrent being applied under sufficient pressure or head to reduce, by vapor condensation or gas reabsorption, the vapor or gas space formed in the filtrate during the filtration period, and also serving to exert a cleansing action on the side of the filter medium which is in contact with the liquid undergoing filtration to remove the solid material which is collected thereon.

This countercurrent is so applied that no air, steam, or the like, enters the filter elements or their connections. To this end, a countercurrent which is wholly liquid in character is employed and the required pressure or head is, therefore, preferably secured hydrostatically. It is immaterial, however, how the pressure or head under which the counter-current is applied is obtained, provided that no air, steam, or the like, is allowed to pass the timing valve and enter the filtration reduced pressure piping system or the filter elements and their connections. A few seconds are sufficient for the application of the countercurrent, the duration of this period being shorter in the present method than in my previous methods since there is less vapor in the filtrate to be condensed.

The invention also contemplates the application of these alternated periods of filtration and countercurrent application in relatively rapid succession as compared with the prior filtration methods, since I have found that if the countercurrent period comes with sufficient frequency appreciable quantities of vapor or gas are prevented from forming in the filtrate.

In addition my investigations have shown that the sudden building up of countercurrent pressure aids in the quick destruction of the vapor or gas space and the removal of the filter cake or collected solids from the filter elements. The vapor tending to form is substantially kept condensed through the frequent sudden reapplications of countercurrent liquid under pressure. This keeps the filter elements full of condensed liquid, and effects a quicker cake removal and a more rapid withdrawal of the filtrate by the reduced filtration pressure.

Referring to Fig. 1, which is merely of the accompanying drawings illustrative of the principles of the improved process, 10 is a filter element, preferably of cylindrical shape, covered with suitable filter medium and submerged in the hot liquid contents 11 of reservoir 12 which in turn is filled and kept full of unfiltered and unthickened mixture through pipe 13 and proper fittings. Filter element 10 connects by means of pipe 14 and connections with the three-way valve 15—16 which in turn connects with vacuum pipe 17 and liquid-countercurrent pipe 18. Vacuum pipe 17 connects with the vacuum receiver 19 wherein the filtrate is separated from the vapors and the air or gas which was dissolved or absorbed in the unfiltered liquid. Pipe 20 leads to a dry suction or vacuum pump (not shown). The condensed filtrate is constantly removed from the receiver by means of pipe 21 and suction pump 22. This pump then delivers the hot filtrate through pipe 23 to the balance of the process and a part of the filtrate passes through pipe 24 and automatic float valve 25 to a small storage tank 26, which is turn connects to pipe 18 and the filter element through the three-way valve 15—16. The plug 16 of three-way valve housing 15 can be switched from the position shown to the position where pipes 18 and 14 are alone joined and vacuum pipe 17 is cut off from pipe 14. This is done in the diagrammatic arrangement by means of handle 27. Dotted lines indicate the position of handle 27 when pipes 18 and 14 are alone connected.

Assuming the tank 12 to be full of hot unfiltered mixture and vacuum to be applied to the interior of the filter element 10, filtrate will pass to the interior of said element where the vapor expansion will at first cause some cooling and condensation of filtrate vapor. Ultimately the interior of the element partially fills with hot filtrate. The balance is made up of steam or vapors and the vapors in expanding entrain and carry over globules and fog particles of unvaporized filtrate to the receiver 19. Some filtrate is lifted through pipe 14 and over to the receiver as liquid pistons caught between vapor bubbles, other filtrate portions remain as liquid in the expanding vapors being sucked into receiver 19. This latter portion is the "wetness" or moisture held in suspension by the moving vapors. It constitutes from about one-half of one percent to about five percent of the steam and vapors passing over to receiver 19 according to the temperature at which filtration takes place, and the size of the pipe 14. It does not affect the temperature of the vapors and can be carried an indefinite distance through pipes by steam and vapors by entrainment and as fog. The physical properties affected by this partial vaporization are the latent heat, the entropy and the specific volume, as reference to any scientific treatise on steam generation will show. The specific volume of these vapors will affect the displacement required at the vacuum pump source.

If after a few minutes the valve plug 16 is switched for a few seconds so that pipes 18 and 14 are alone connected, filtrate from storage tank 26 of slightly cooler temperature than the fresh filtrate in the element will rush back to the interior of element 10, fill all the vapor space and then flow back through the filter medium and dislodge the film of solids intercepted by and adhering to the medium. It will be noticed here, that before the film of solids can be effectively discharged, the vapor space that actually existed within pipe 14 and filter element 10 had to be completely filled with liquid from the hydrostatic column, 18, 26. This liquid column in rushing in under atmospheric pressure and gravity conditions has less tendency to flash to vapor than has the filtrate that was being removed from the filtration system under vacuum. This necessity of filling the vapor space before the cake can be discharged causes an undue consumption of countercurrent filtrate, and lengthens the countercurrent period. The solids dislodged from the filter element 10, as well as those which may settle by gravity, collect on the bottom of the tank 12, which may be in the shape of a cone 28, and they may be removed through the connection 29.

The necessity of filling the vapor space before the cake can be discharged may be at least a partial explanation of the lowered filtration rate of hot liquids. Furthermore, this lowered filtration rate might also be caused to a certain extent by the excessive evaporation under suction at temperatures near the boiling point in vacuo, or because of one or more of the following reasons: (a) long filtration period, for example, two minutes and over, thus augmenting vapor formation; (b) the use of compressed air on top of a filtrate piston stored within a filtrate chamber either directly within the top of the filter element or anywhere between the element or elements and timing valve.

If instead of using a purely hydrostatic filtrate counter-current in the above instance, we introduce compressed air through pipe 18 and it acts on a filtrate storage supply situated anywhere between valve 15—16 and elements 10, or even situated directly within element 10, this compressed air will also have to be exhausted from the filtrate reservoir and filtrate line when valve 15—16 is switched back so that filtration may take place under partial vacuum. This use of compressed air or even admission of atmospheric air to any portion of the system between the switching valve 15—16 and the elements only further retards the filtration rates of hot or boiling liquids.

One important feature of the present improved process, therefore, comprises the use of a purely liquid counter-current, so that no atmospheric air or other air can enter the vacuum filtration system between the filter element or elements and the vacuum source. This results in the elimination of filtrate storage chambers for air or additional blow-back pressure purposes, between the switching or timing valve 15—16 and the elements 10 themselves. In order to obtain a liquid countercurrent under the appropriate head, a portion of the filtered liquid is preferably returned to a point, such as storage tank 26, at least ten feet above the timing or switching valve and the filter elements. Returning liquid from other sources or filtration devices that produce a filtrate equivalent to the main filtrate from this process, to storage tank 26 above the timing valve 15—16 is equivalent to returning a portion of the filtrate from the filter-thickener system itself.

Another important feature in this improved process of thickening and filtering hot mixtures by suction means is the further elimination of vapor space within the filter elements themselves and the piping leading therefrom without materially reducing the temperature of the filtrate. This is obtained as follows:

(a) The reversal from filtration to hydrostatic filtrate cake discharge period is sudden and follows immediately upon the filtration period.

(b) The reversal back to filtration under suction is equally sudden and follows immediately upon the filtrate counter-current period.

(c) The filtration period itself does not ordinarily exceed two minutes for liquids from 75 to 80 degrees (centigrade) temperature, and should be much shorter for liquids hotter than these temperatures, i. e. about thirty seconds, and the hydrostatic filtrate cake discharge period immediately following, should not be much over two seconds in duration.

In other words, the pipe 14 and element or elements 10 are kept as full as possible with filtrate through the rapid impulse and pulsation from one period of the cycle to another. If the period of filtration suddenly and almost instantaneously follows the filtrate cake discharge period, the condensed filtrate completely filling the elements and piping during the cake discharge period will rush out into the receiver 19 without loss of vacuum. This aids in the suction action. And then the instant vapors start to form to cause vapor occupying space within the elements and pipe system, the hydrostatic filtrate cake discharge period should follow. This point can be perceived by use of a vacuum gauge on line 17. The instant the gauge shows a drop in vacuum, due to formation of vapors, the hydrostatic filtrate cake discharge period should be applied, thus not only removing the cake from the elements but also reducing or eliminating the vapor forming tendency. The result is a series of sudden pulsations or filtrate impulses under vacuum away from the interior of the elements opposed by shorter sudden impulses or shocks of completely condensed filtrate back into said elements for the double purpose of reducing vapor space and removing the film or cake of intercepted solids from the exterior of the elements. It will therefore be seen that this improvement does not aim at a short or sudden filtrate countercurrent shock alone.

The present improvement aims at a combination of short sudden filtrate countercurrent cake discharge and vapor reducing pulsation preferably under hydrostatic head, immediately followed by sudden short suction filtration impulses, the length of the suction impulses being materially shorter than the durations heretofore used for thickening purposes and depending on the nature of the solids and liquids being separated, and the temperature and vacuum conditions to be met.

Any arrangement of filter elements and hydrostatic column can be used to carry out the steps of the present process and the elements may be arranged in square, oblong or circular tanks or in any desired manner as long as the foregoing principles are made use of.

Figs. 2 and 3 illustrate one very economical form of apparatus that may be used for carrying out this process on a commercial scale. The same index numbers for the various essential parts of Fig. 1 are used in Figs. 2 and 3. Here the filter elements 10′ are arranged in frames 30 having filtrate outlets 31. Four or more elements are held in place in each frame by means of springs at 32. The flow of filtrate from the elements themselves to the frame 30 is through the connection at the bottom of each element. Any desired number of elements can be placed in each frame according to the installation requirements. Each frame hangs on casting 15′ and makes connection with ports 33 in same. A series of frames 30 thus radiate from the circular ported casting 15′ filling or occupying most of the annular space around the centrally located receiver 19′ in tank or reservoir 12′ (see Figs. 2 and 3).

The filtrate is sucked from 31 to ports 33 in the central casting 15′ which is really equivalent to housing 15 in Fig. 1. Casting 15′ has a number of radiating ports 33 equivalent to the number of frames 30 attached to and radiating from same. Within the center of 15′ is the plug piece 16′ which is made to shift from port 33 to adjacent port 33 suddenly so that one after another one or more frames with their elements are quickly cut off from the vacuum system and a counter-current of hot condensed filtrate automatically rushes in the opposite direction through port 33 from the hydrostatic connections 18′ and filtrate reservoir 26′ through port 35 of plug 16′. The plug 16′ is made to jerk suddenly from one port to another by means of a ratchet mechanism 34 and lever 27′ which in turn is moved backward (pawl releasing movement) with a slower speed than the reverse forward movement (ratchet movement) by the quick-return mechanism shown in Figs. 3 and 4. Any quick return mechanism that will produce a sudden movement of the plug 16′ from port to port so that the vacuum is suddenly cut off and applied to various nests of elements simultaneously with the sudden application and cut off of filtrate countercurrent may be substituted for the valve shifting mechanism shown in Figs. 3 and 4.

Furthermore, the valve plug 16′ may have more than one countercurrent port 35 (see Figs. 5 and 6). The rotating plug here has two wings with ports 35, 35. This enables applying the sudden countercurrent to twice as many ports 33 in one revolution of the plug as is shown in arrangement in Fig. 2. For instance, if the two wings of plug 16′ of Figs. 5 and 6 pause for one and one-half seconds over opposite ports 33, 33 and are shifted within a half of a second to the two following opposed ports 33, 33, etc., in one-half of a plug revolution, all thirty-two ports (33, 33, 33, etc.) will have been suddenly cut off and cut back in, and the time consumed will have been thirty-two seconds. This means that the suddenly applied vacuum and suddenly interrupted vacuum period on all ports will have been thirty-two seconds, representing one full filtering period for each port, and the suddenly applied and suddenly interrupted hydrostatic filtrate countercurrent shock on each port will have lasted one and one-half seconds, and the time for a full rotation of plug 16′ will have been sixty-four seconds.

It is therefore apparent that the plug 16′ can have even more than two wings and ports 35 in order to produce even a shorter cycle for the same speed of revolution of the plug itself. This possibility obviates the necessity of operating the ratchet mechanism too rapidly or too often.

The filtrate from the ports (33, 33, 33) that are filtering, is sucked through the opening 17' in the bottom of the housing 15' (see Figs. 2, 5 and 6) into the main vacuum receiver 19' situated directly in the center of the circular tank 12' which contains the mixture being filtered and thickened. Partial vacuum is produced within the receiver 19' through connection 20' connected with an appropriate vacuum pump and also a condenser to remove vapors issuing from said receiver 19' through the vacuum lines which in turn will further augment the vacuum and lessen the duty on the vacuum pump. The condensed filtrate collected within the bottom of 19' is removed from same by means of line 21' connected with either a barometric seal or proper pump, equivalent to pump 22 shown in Fig. 1, which in turn can return some of the filtrate to filtrate reservoir 26' above the switching plug valve and filter elements.

Tank 12' Fig. 2, is supplied with the mixture to be filtered and thickened by means of pipe 13'. The hot inflowing unthickened mixture flows upward around 19' keeping the filtrate passing through same hot, and passes up around the annular tank 36 which is open entirely at its upper end. Any surplus of feed will therefore overflow the upper rim 37 of 36 and return by means of pipe 38 to the original source of supply. The thickened mud collects in the bottom of the tank which may be a cone 28', or have less inclination and be equipped with scrapers. The mud then can be removed from the tank bottom through connections 29' or any other convenient means.

The improved result attained by the present invention is attributed in large degree to the removing of the filtrate from the filter elements in frequent sudden vacuum impulses followed suddenly by a relatively short and sudden application of a countercurrent of liquid only under sufficient head to positively reduce any vapor space that may have been formed during the vacuum impulse, and to instantly dislodge the film of intercepted solids from the exterior of the filter medium. These sudden vacuum impulses are preferably of such short duration that vapor or gas does not have time to form to any appreciable extent in the filtrate. Nevertheless, the time of application of the vacuum, or reduced pressure, is sufficient to cause a relatively large quantity of the filtered liquid to pass through the filter medium. When the vapor space is eliminated, or substantially eliminated, from the filter element and its connections, the amount of the liquid required for the application of the cake or solids discharge countercurrent is greatly reduced.

Investigations which I have conducted in the filtration and thickening of hot carbonated sugar juices indicate conclusively that by changing the operation of the existing equipment so as to cause it to operate in accordance with the principles of my present invention, there has resulted a remarkable increase in the daily capacity of the apparatus. Thus, where the apparatus previously filtered the carbonated juice from approximately one ton of beets per square foot of area of filter surface per day, after modifying the operation of the apparatus so as to carry out the process of the present invention, the same apparatus filtered and thickened the carbonated juice from three to four tons of beets per square foot of area of filter surface per day. Furthermore, both the filtrate and the thickened solids, are of as good or even better quality than previously. This increased capacity affects the efficiency of the filtration thickening equipment throughout, resulting in less filter medium being in actual use, and less floor space being occupied by it, as well as lowered operation and maintenance costs, and use of less vacuum pump capacity and consequent power consumption.

I claim:

1. A continuous filtering and thickening process for hot liquid mixtures or liquid mixtures containing disolved or absorbed gases and the like, wherein the mixture to be filtered and the filtrate are continuously in contact with opposite sides of a filter medium which comprises applying a reduced pressure to the filtrate side of the filter medium for a limited time only, that is, until the formation of a vapor or liberation of gas within the filtrate begins to appreciably reduce the space occupied by the liquid portion of the filtrate, and then applying a liquid countercurrent to the same side of the filter medium so as to reduce by consequent vapor condensation or gas reabsorbtion the vapor or gas space previously formed, and to exert a cleansing action on the other side of the filter medium, said liquid countercurrent being applied in such manner that no air or the like enters the filtrate.

2. A continuous filtering and thickening process for hot liquid mixtures or liquid mixtures containing dissolved or absorbed gases and the like, wherein the mixture to be filtered and the filtrate are continuously in contact with opposite sides of a filter medium which comprises, applying a reduced pressure to the filtrate side of the filter medium to produce filtration, said pressure being applied only until the formation of vapor or liberation of gas within the filtrate begins to appreciably reduce the space occupied by the liquid portion of the filtrate, and then applying to the same side of the filter medium a countercurrent of liquid only under sufficient pressure to recondense the vapor or compress the gas formed during the application of filtration pressure and to exert a cleansing action on the other side of the filter medium.

3. A continuous filtering and thickening process for hot liquid mixtures or liquid mixtures containing dissolved or absorbed gases and the like wherein the mixture to be filtered and the filtrate are continuously in contact with opposite sides of a filter medium which comprises, applying a reduced pressure to the filtrate side of the filter medium for a limited time only, that is, until the formation of vapor or liberation of gas within the filtrate begins to appreciably reduce the space occupied by the liquid portion of the filtrate, and then applying a countercurrent to the same side of the filter medium so as to reduce by consequent vapor condensation or gas reabsorption of the vapor or gas space previously formed and to exert a cleansing action on the other side of the filter medium.

4. A continuous filtering and thickening process for hot liquid mixtures or liquid mixtures containing dissolved or absorbed gases and the like wherein the mixture to be filtered and the filtrate are continuously in contact with opposite sides of a filter medium which comprises, applying a reduced pressure to the filtrate side of the filter medium for a limited time only, that is, until the formation of vapor or liberation of gas begins to appreciably reduce the space occupied by the liquid portion of the filtrate, and then immediately applying to the same side of the filter medium a liquid countercurrent under a purely hydrostatic head so as to reduce by consequent vapor condensation or gas reabsorption the vapor or gas space previously formed and to exert a cleansing action on the other side of the filter medium.

5. A continuous filtering and thickening process for hot liquid mixtures or liquid mixtures containing dissolved or absorbed gases and the like wherein the mixture to be filtered and the filtrate are continuously in contact with opposite sides of a filter medium which comprises, applying a reduced pressure to the filtrate side of the filter medium for a limited time only, that is, until the formation of vapor or liberation of gas begins to appreciably reduce the space occupied by the liquid portion of the filtrate, and then immediately applying to the same side of the filter medium a hot filtrate countercurrent under sufficient head to reduce by vapor condensation or gas reabsorption a substantial portion of the vapor or gas previously formed in the filtrate and to exert a cleansing action on the other side of the filter medium.

6. A continuous filtering and thickening process for hot liquid mixtures or liquid mixtures containing dissolved or absorbed gases and the like wherein the mixture to be filtered and the filtrate are continuously in contact with opposite sides of a filter medium which comprises, applying a reduced pressure to the filtrate side of the filter medium for a limited time only, that is, until the formation of vapor or liberation of gas begins to appreciably reduce the space occupied by the liquid portion of the filtrate, and then immediately applying to the same side of the filter medium a liquid equivalent to the filtrate under a sufficient head to reduce by vapor condensation or gas reabsorption a substantial amount of the vapor or gas previously formed and to exert a cleansing action on the other side of the filter medium.

7. A continuous filtering and thickening process for hot liquid mixtures or liquid mixtures containing dissolved or absorbed gases and the like wherein the mixture to be filtered and the filtrate are continuously in contact with opposite sides of a filter medium which comprises, suddenly applying a reduced pressure to the filtrate side of the filter medium for a limited time only, that is, until the formation of vapor or liberation of gas begins to appreciably reduce the space occupied by the liquid portion of the filtrate, suddenly cutting off this pressure, and suddenly applying to the same side of the filter medium a liquid counter current under a sufficient head so as to reduce by consequent vapor condensation or gas reabsorption the vapor or gas space previously formed and to exert a cleansing action on the other side of the filter medium.

8. A continuous filtering and thickening process for hot liquid mixtures or liquid mixtures containing dissolved or absorbed gases and the like wherein the mixture to be filtered and the filtrate are continuously in contact with opposite sides of a filter medium which comprises, applying a reduced pressure to the filtrate side of the filter medium for a limited time only, that is, until the formation of vapor or liberation of gas begins to appreciably reduce the space occupied by the liquid portion of the filtrate, and then immediately applying to the same side of the filter medium a hot filtrate countercurrent under a sufficient head so as to reduce by consequent vapor condensation or gas reabsorption the vapor or gas space previously formed and to exert a cleansing action on the other side of the filter medium.

9. A continuous filtering and thickening process for hot liquid mixtures or liquid mixtures containing dissolved or absorbed gases and the like wherein the mixture to be filtered and the filtrate are continuously in contact with opposite sides of a filter medium which comprises, applying a reduced pressure to the filtrate side of the filter medium for a limited time only, that is, until the formation of vapor or liberation of gas begins to appreciably reduce the space occupied by the liquid portion of the filtrate, and then immediately applying to the same side of the filter medium a liquid equivalent to the filtrate under a sufficient head so as to reduce by consequent vapor condensation or gas reabsorption the vapor or gas space previously formed and to exert a cleansing action on the other side of the filter medium.

10. A continuous filtering and thickening process for hot liquid mixtures or liquid mixtures containing dissolved or absorbed gases and the like wherein the mixture to be filtered and the filtrate are continuously in contact with opposite sides of a filter medium which comprises, suddenly applying suction to the filtrate side of the filter medium for a limited time only, that is, until the formation of vapor or liberation of gas begins to appreciably reduce the space occupied by the liquid portion of the filtrate, suddenly interrupting this suction, and suddenly applying to the same side of the filter medium a liquid countercurrent under a sufficient head so as to reduce by consequent vapor condensation or gas reabsorption the vapor or gas space previously formed and to exert a cleansing action on the other side of the filter medium.

11. A continuous filtering and thickening process for hot liquid mixtures or liquid mixtures containing dissolved or absorbed gases and the like wherein the mixture to be filtered and the filtrate are continuously in contact with opposite sides of a filter medium which comprises, suddenly applying a reduced pressure to the filtrate side of the filter medium for a limited time only, that is, until the formation of vapor or liberation of gas begins to appreciably reduce the space occupied by the liquid portion of the filtrate, suddenly cutting off the reduced pressure, and suddenly applying to the same side of the filter medium hot filtrate under a sufficient head so as to reduce by consequent vapor condensation or gas reabsorption the vapor or gas space previously formed and to exert a cleansing action on the other side of the filter medium.

12. A continuous filtering and thickening process for hot liquid mixtures or liquid mixtures containing dissolved or absorbed gases and the like wherein the mixture to be filtered and the filtrate are continuously in contact with opposite sides of a filter medium which comprises, suddenly applying a reduced pressure to the filtrate side of the filter medium for a limited time only, that is, until the formation of vapor or liberation of gas begins to appreciably reduce the space occupied by the liquid portion of the filtrate, suddenly cutting off the reduced pressure, and suddenly applying a liquid equivalent to the filtrate under sufficient pressure so as to compress the vapor or gas previously formed in the filtrate and for exerting a cleansing action against the other side of the filter medium.

13. A continuous filtering and thickening process for hot liquid mixtures or liquid mixtures containing dissolved or absorbed gases and the like wherein the mixture to be filtered and the filtrate are continuously in contact with opposite sides of a filter medium which comprises, intermittently and successively applying a reduced pressure filtration period, and a liquid countercurrent period to the filtrate side of the filter medium, the filtration periods being stopped substantially as soon as vapor begins to form or gas begins to be liberated in the filtrate.

14. A continuous filtering and thickening process for hot liquid mixtures or liquid mixtures containing dissolved or absorbed gases and the like wherein the mixture to be filtered and the filtrate are continuously in contact with opposite sides of a filter medium which comprises, intermittently and successively applying a reduced pressure filtration period, and a hot filtrate countercurrent period to the filtrate side of the filter medium, the filtration periods being stopped substantially as soon as vapor begins to form or gas to be liberated in the filtrate.

15. A continuous filtering and thickening process for hot liquid mixtures or liquid mixtures containing dissolved or absorbed gases and the like wherein the mixture to be filtered and the filtrate are continuously in contact with oppsoite sides of a filter medium which comprises, intermittently and sucessively applying a reduced pressure filtration period, and a countercurrent period employing a liquid which is the equivalent of the filtrate, to the filtrate side of the filter medium, the filtration periods being stopped substantially as soon as vapor begins to form or gas begins to be liberated in the filtrate.

16. A continuous filtering and thickening process for hot liquid mixtures or liquid mixtures containing dissolved or absorbed gases and the like wherein the mixture to be filtered and the filtrate are continuously in contact with opposite sides of a filter medium which comprises, intermittently and successively applying a vacuum filtration period, and a liquid countercurrent period to the filtrate side of the filter medium, the filtration periods being stopped substantially as soon as vapor begins to form or gas begins to be liberated in the filtrate.

17. A continuous filtering and thickening process for hot liquid mixtures or liquid mixtures containing dissolved or absorbed gases and the like wherein the mixture to be filtered and the filtrate are continuously in contact with opposite sides of a filter medium which comprises, intermittently and successively applying a reduced pressure filtration period, and a liquid countercurrent period to the filtrate side of the filter medium, the filtration periods being stopped substantially as soon as the formation of vapor or liberation of gas within the filtrate appreciably reduces the space occupied by the liquid filtrate itself, and the liquid countercurrent periods being terminated substantially as soon as the vapor spaces formed during the filtration periods are eliminated.

18. A continuous filtering and thickening process for hot liquid mixtures or liquid mixtures containing dissolved or absorbed gases and the like, wherein the mixture to be filtered and the filtrate are continuously in contact with opposite sides of a filter medium which comprises, intermittently and successively applying a vacuum filtration period, and a liquid countercurrent period, to the filtrate side of the filter medium, the filtration periods being stopped substantially as soon as the formation of vapor or liberation of gas within the filtrate appreciably reduces the space occupied by the liquid filtrate itself, and the liquid countercurrent periods being terminated substantially as soon as the vapor spaces formed during the filtration periods are eliminated.

19. A continuous filtering and thickening process for hot liquid mixtures or liquid mixtures containing dissolved or absorbed gases and the like which comprises, submerging a hollow filter element in the mixture being filtered within a container, applying a reduced pressure to the interior of the filter element, returning a portion of the filtrate to a point above the filter element, cutting off the reduced pressure as soon as the formation of vapor or liberation of gas appreciably reduces the space within the filter element occupied by the liquid filtrate, and connecting the returned portion of the filtrate with the filter element so as to reduce by consequent vapor condensation or gas reabsorption the vapor or gas space formed during the application of reduced pressure and for discharging the cake formed on the outside of the filter element.

20. A continuous filtering and thickening process for hot liquid mixtures or liquid mixtures containing dissolved or absorbed gases and the like which comprises, submerging a hollow filter element in the mixture being filtered within a container, applying a vacuum to the interior of the filter element, returning a portion of the hot condensed filtrate to a point above the filter element, cutting off the vacuum as soon as the formation of vapor or liberation of gas appreciably reduces the space within the filter element occupied by liquid filtrate, and connecting the returned portion of the filtrate with the filter element so as to reduce by consequent vapor condensation or gas reabsorption the vapor or gas space formed during the application of reduced pressure and for discharging the cake formed on the outside of the filter element.

21. A continuous filtering and thickening process for hot liquid mixtures or liquid mixtures containing dissolved or absorbed gases and the like which comprises, submerging a hollow filter element in the mixture being filtered within a container, applying a reduced pressure to the interior of the filter element, providing a liquid equivalent to the filtrate at a point above the filter element, cutting off the reduced pressure as soon as the formation of vapor or liberation of gas appreciably reduces the space within the filter element occupied by liquid filtrate, and connecting the elevated liquid equivalent of the filtrate with the filter element so as to reduce by consequent vapor condensation or gas reabsorption the vapor or gas space formed during the application of reduced pressure and for discharging the cake formed on the outside of the filter element.

In testimony whereof I affix my signature.

ALBERT LEGRAND GENTER.